(12) United States Patent
Yukita et al.

(10) Patent No.: US 12,722,465 B2
(45) Date of Patent: Sep. 1, 2026

(54) PARTING SEAL

(71) Applicant: TOYODA GOSEI CO., LTD., Kiyosu (JP)

(72) Inventors: Shoya Yukita, Kiyosu (JP); Masatoshi Nojiri, Kiyosu (JP); Yasuhiro Shimizu, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 19/062,369

(22) Filed: Feb. 25, 2025

(65) Prior Publication Data

US 2025/0303836 A1 Oct. 2, 2025

(30) Foreign Application Priority Data

Mar. 26, 2024 (JP) ................................ 2024-049136

(51) Int. Cl.

| | |
|---|---|
| ***B60J 10/86*** | (2016.01) |
| ***B60J 10/16*** | (2016.01) |
| ***B60J 10/23*** | (2016.01) |
| ***B60J 10/40*** | (2016.01) |
| *B60J 10/36* | (2016.01) |

(52) U.S. Cl.

CPC ............... *B60J 10/86* (2016.02); *B60J 10/16* (2016.02); *B60J 10/23* (2016.02); *B60J 10/40* (2016.02); *B60J 10/36* (2016.02)

(58) Field of Classification Search

CPC ... B60J 10/86; B60J 10/40; B60J 10/36; B60J 10/24; B60J 10/50; B60J 10/84

See application file for complete search history.

(56) References Cited

U.S. PATENT DOCUMENTS

| | | | | |
|---|---|---|---|---|
| 6,817,651 B2 * | 11/2004 | Carvalho | B60J 10/75 296/146.15 |
| 2012/0036788 A1 * | 2/2012 | Purdy | B60J 10/30 49/493.1 |
| 2014/0223830 A1 * | 8/2014 | Shigehiro | B60J 10/87 49/495.1 |
| 2015/0273993 A1 * | 10/2015 | Sobue | B60J 10/84 296/146.9 |
| 2017/0182871 A1 * | 6/2017 | Taketomo | B60J 10/25 |
| 2017/0368923 A1 * | 12/2017 | Kuwabara | B60J 10/77 |
| 2022/0234431 A1 * | 7/2022 | Shimada | B60J 10/86 |
| 2023/0166589 A1 * | 6/2023 | Sasaki | B60J 10/86 49/475.1 |
| 2024/0093538 A1 * | 3/2024 | Gabbianelli | E05B 81/36 |

FOREIGN PATENT DOCUMENTS

| | | |
|---|---|---|
| JP | 2002-59746 * | 2/2002 |
| JP | 2008-37256 * | 2/2008 |
| JP | 2020-117053 A | 8/2020 |

* cited by examiner

*Primary Examiner* — Gregory J Strimbu

(74) *Attorney, Agent, or Firm* — Posz Law Group, PLC

(57) ABSTRACT

In a parting seal that seals a gap between a front door and a rear door, one end of a seal portion, including a substantially arc shape, and one end of a mounting base, including a substantially L shape, are connected by a connecting portion, the seal portion and the mounting base are formed of a material with higher hardness compared to the connecting portion, and a seal-portion distal end of the seal portion, located opposite to the connecting portion, comes into contact with the mounting base when the front door is closed.

4 Claims, 5 Drawing Sheets

PARTING SEAL

CROSS REFERENCE TO RELATED APPLICATION

This application claims the priority benefit of Japanese Patent Application No. 2024-049136 filed on Mar. 26, 2024. The entirely of the above-mentioned patent application is hereby incorporated by reference herein and made a part of this application.

BACKGROUND OF THE INVENTION

(1) Field of the Invention

The present invention relates to a parting seal that seals a gap formed on the outer surface of a vehicle, such as an automobile, where at least one of a first member and a second member is an opening/closing door, and the first member and the second member are adjacent to each other.

(2) Description of Related Art

Improving the quietness of a vehicle, such as an automobile, enhances occupant comfort and thus increases the appeal for improving product competitiveness. In an electric automobile, which is expected to spread rapidly in the future, the conventionally installed engine is removed, and with the removal of engine noise, road noise and wind noise become the primary remaining sources of noise. Therefore, countermeasures to reduce these noises are increasingly required.

For example, as shown in FIG. 9, a parting seal is disposed at an overlapping part between a front door and a rear door (Japanese Patent Application Laid-Open No. 2020-117053).

A parting seal 100 includes an L-shaped mounting portion 110 and an arc-shaped seal portion 120. The mounting portion 110 is fixed to a rear-door front end 310 with an adhesive such that the seal portion 120 faces a front-door rear end 210. The parting seal 100 is formed as a long product with a uniform cross-sectional shape by extrusion molding using a rubber material such as ethylene propylene diene monomer (EPDM).

The seal portion 120 of the parting seal 100 is then flexed and comes into contact with the front-door rear end 210 to exert the desired sound insulation and air tightness.

However, in Japanese Patent Application Laid-Open No. 2020-117053, the parting seal 100 is mounted for the purpose of intentionally vibrating an outer panel 320 of a rear door 300 by positively propagating the impact from closing a front door 200 to the rear door 300, generating a low sound also from the outer panel 320 of the rear door 300, and emphasizing the low-frequency component of the closing sound of the front door 200. The parting seal 100 has not reduced road noise, wind noise, or other noises, and has not suppressed the vibration of the front door 200 during travel.

SUMMARY OF THE INVENTION

In a vehicle such as an automobile, a door or a hood, which is a rotary door, vibrates due to air resistance or tire contact with the road during travel, and the frequency of the vibration primarily ranges from 200 Hz to 1250 Hz.

The present invention provides a parting seal capable of reducing road noise, wind noise, and other noises.

In order to solve the above problems, a first aspect of the present invention is a parting seal including rubber or resin that seals a gap formed on an outer surface of a vehicle by a first member and a second member being adjacent to each other, at least one of the first member or the second member being an opening/closing door. In the parting seal, one end of a seal portion, including a substantially arc shape, and one end of a mounting base, including a substantially L shape, are connected by a connecting portion, the seal portion and the mounting base are formed of a material with higher hardness compared to the connecting portion, and a seal-portion distal end of the seal portion, located on the side opposite to the connecting portion, is in contact with the mounting base when the opening/closing door is closed.

For example, when the first member is a rotary door and the second member is a non-rotary door, the mounting base of the parting seal is mounted on the second member. The first member, which is the rotary door, is more likely to vibrate than the second member, which is the non-rotary door, due to road noise, wind noise, or other noises during travel.

In the first aspect of the present invention, in the parting seal, one end of the seal portion, including a substantially arc shape, and one end of the mounting base, including a substantially L shape, are connected by the connecting portion, the seal portion and the mounting base are formed of a material with higher hardness compared to the connecting portion, and the seal-portion distal end of the seal portion, located on the side opposite to the connecting portion, is in contact with the mounting base when the opening/closing door is closed. Therefore, when the seal portion, which has increased rigidity due to higher hardness, comes into contact with the first member, the vibration of the first member can be propagated to the seal portion, propagated from the seal portion to the mounting base, and further propagated from the mounting base to the second member. As a result, vibration generated by air resistance on the first member, which is the opening/closing door, or by tire contact with the road during travel, can be efficiently propagated to the second member, thereby reducing road noise, wind noise, and other noises.

Since the connecting portion has lower hardness than the seal portion and the mounting base, when the seal portion comes into contact with the opening/closing door, the connecting portion is deformed, enabling the seal portion to follow the opening/closing movement of the opening/closing door. As a result, the opening/closing operation of the opening/closing door is not affected, and damage, such as deformation or scratches, does not occur in the seal portion.

Since at least one of the first member or the second member is an opening/closing door, there are a case where one of the first member or the second member is an opening/closing door, such as a hood and a fender, and a case where both the first member and the second member are rotary doors, such as a front door and a rear door.

A second aspect of the present invention is the parting seal according to the first aspect, in which the connecting portion is formed across the seal portion and the mounting base.

As described above, since the seal portion has high hardness, the seal portion is hardly bent when the opening/closing door comes into contact with the seal portion. Therefore, when the seal-portion distal end comes into contact with the mounting base, a force directed toward the connecting portion is generated at the contact part between the seal portion and the opening/closing door, simultaneously with a force directed toward the vehicle inner.

In the second aspect of the present invention, since the connecting portion is formed across the seal portion and the mounting base, when the seal-portion distal end comes into contact with the mounting base, the connecting portion is deformed to absorb a force directed toward the connecting portion, enabling prevention of the seal portion or the connecting portion from protruding toward the vehicle outer. This can prevent the appearance from being impaired by the protrusion of the seal portion or the connecting portion, and prevent new noise from being generated due to the protrusion of the seal portion or the connecting portion.

In a case where the connecting portion is formed only on the mounting base, when the seal-portion distal end comes into contact with the mounting base, the vicinity of the seal portion on the connecting portion side may protrude toward the vehicle outer by being deformed to rise toward the vehicle outer by a force directed toward the connecting portion. This may cause the appearance to be impaired or the effect of reducing road noise, wind noise, and other noises to be impaired by the deformation of the seal portion, which is not preferable. When the connecting portion is formed only on the seal portion, at the time of connection of the seal-portion distal end with the mounting base, the connecting portion may protrude by being deformed into a convex shape toward the vehicle outer by a force directed toward the connecting portion, causing the appearance to be impaired, which is not preferable. In addition, the effect of reducing road noise, wind noise, and other noises may be impaired by the deformation of the connecting portion, which is not desirable.

A third aspect of the present invention is the parting seal according to the first aspect, in which an inclined portion, extending in a direction away from the seal-portion distal end, is formed at a mounting-base distal end of the mounting base located on the side opposite to the connecting portion, and the seal-portion distal end comes into contact with the inclined portion when the opening/closing door is closed.

In the third aspect of the present invention, the inclined portion, extending in the direction away from the seal-portion distal end, is formed at the mounting-base distal end of the mounting base located on the side opposite to the connecting portion, and the seal-portion distal end comes into contact with the inclined portion when the opening/closing door is closed. Therefore, the seal-portion distal end can move so as to slide while remaining in contact with the inclined portion. As a result, the reaction force that the seal-portion distal end receives from the mounting base due to the contact can be suppressed, thereby preventing an adverse effect on the opening/closing operation of the opening/closing door.

A fourth aspect of the present invention is the parting seal according to the third aspect, in which a surface contact portion is formed at the seal-portion distal end, and the surface contact portion comes into contact with the inclined portion when the opening/closing door is closed.

In the fourth aspect of the present invention, the surface contact portion that comes into surface contact with the inclined portion is formed at the seal-portion distal end, the contact area between the seal portion and the inclined portion increases when the opening/closing door is closed. Therefore, the efficiency of vibration propagation can be improved compared to a case where the seal portion and the inclined portion are in point contact.

DETAILED DESCRIPTION OF PREFERRED EMBODIMENTS

Figure 1:
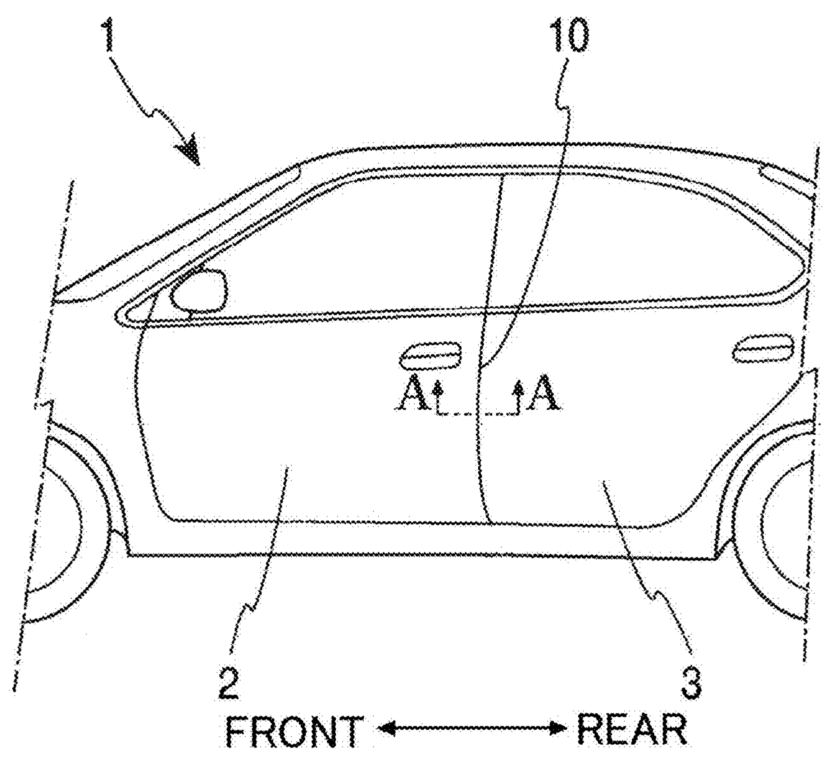
FIG. 1 is a side view showing an automobile.

With reference to FIGS. 1 to 4, a parting seal of a first embodiment of the present invention will be described. FIG. 1 is a left side view showing an automobile 1. In FIG. 1, the first member is a front door 2, and the second member is a rear door 3. Therefore, in the present embodiment, both the first member and the second member are rotary doors. Both the front door 2 and the rear door 3 are made of metal. A parting seal 10 is mounted on a rear-door front end 30 (FIG. 2) of a second member that is the rear door 3.

The parting seal 10 fills a gap formed between the rear side of the front door 2 and the front side of the rear door 3 in FIG. 1, and seals between the front door 2 and the rear door 3.

Figure 2:
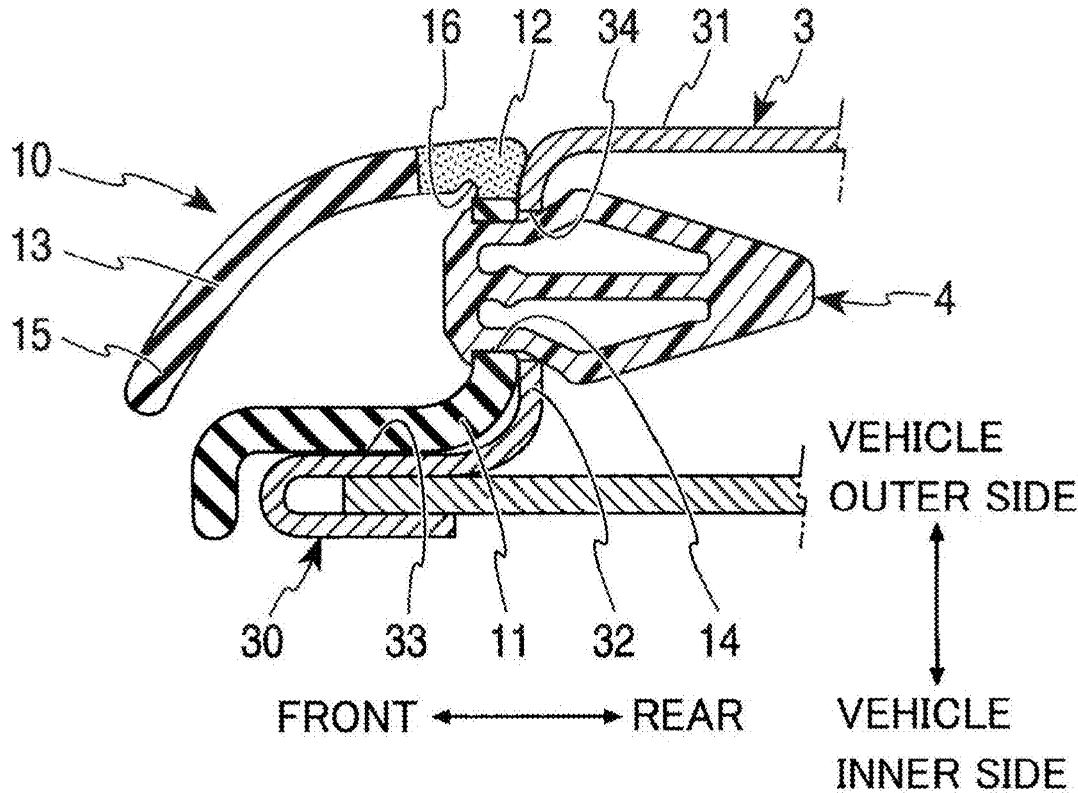
FIG. 2 is an enlarged cross-sectional view taken along line A-A of FIG. 1 in which a parting seal of a first embodiment of the present invention is mounted, and is a view showing a state before a front door is closed.

FIG. 2 is an enlarged cross-sectional view taken along line A-A of FIG. 1 in which the parting seal of the first embodiment of the present invention is mounted, and is a view showing a state before the front door 2 is closed. The parting seal 10 includes a mounting base 11, a seal portion 13, and a connecting portion 12 that connects the mounting base 11 and the seal portion 13. The mounting base 11 is formed in an L-shape, with the front distal end curved toward the vehicle inner and covering the rear-door front end 30. The seal portion 13 is formed in a convex arc shape protruding in a direction away from the mounting base 11.

The connecting portion 12 is formed in a bent shape across the mounting base 11 and the seal portion 13. A connecting-portion recess 16 is formed on the bent part of the connecting portion 12 on the seal portion 13 side and the vehicle inner side.

In the present embodiment, the parting seal 10 is molded by extrusion molding as a long product with a uniform cross-sectional shape, using EPDM with an International Rubber Hardness (IRHD) of 90±5 for the mounting base 11 and the seal portion 13, and EPDM sponge material for the connecting portion 12. In addition, holes 14 are formed at predetermined intervals in the longitudinal direction. Note that the mounting base 11 and the seal portion 13 of the parting seal 10 desirably have an IRHD of 55 to 95.

In the embodiment of the present invention, the material constituting the parting seal 10 can be made of rubber, thermoplastic elastomer, soft synthetic resin, or the like. For the rubber, ethylene propylene diene rubber (EPDM) is desirable, and for the thermoplastic elastomer, olefinic thermoplastic elastomers (TPO) and dynamic cross-linked thermoplastic elastomers (TPV) are desirable from the viewpoint of weather resistance, recyclability, cost, and the like.

The parting seal 10 is mounted on a bent portion 32 and a hemmed portion 33 of an outer panel 31 at the rear-door front end 30 of the rear door 3. A through hole 34 is formed in the bent portion 32 of the outer panel 31 at the location of the hole 14 of the parting seal 10. By inserting a clip 4 from the hole 14 of the parting seal 10 and inserting the clip 4 into the through hole 34, the parting seal 10 can be mounted on the rear-door front end 30.

Therefore, when the parting seal 10 is mounted on the rear-door front end 30, the mounting base 11 of the parting seal 10 comes into contact with the bent portion 32 of the outer panel 31. In FIG. 2, the mounting base 11 is also in contact with the hemmed portion 33 of the outer panel 31.

Figure 3:
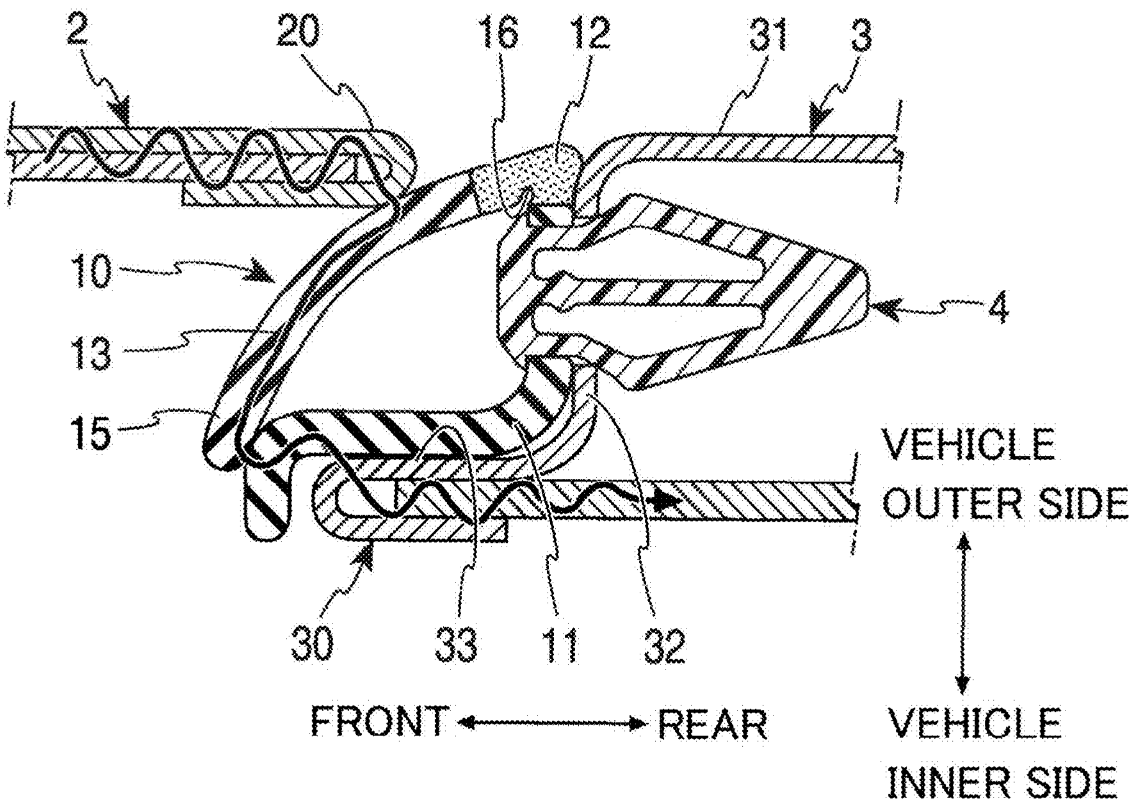
FIG. 3 is an enlarged cross-sectional view taken along line A-A of FIG. 1 in which the parting seal of the first embodiment of the present invention is mounted, and is a view showing a state when the front door is closed.

In FIG. 2, a seal-portion distal end 15 of the seal portion 13 is not in contact with the mounting base 11. FIG. 3 is an enlarged cross-sectional view taken along line A-A of FIG. 1 in which the parting seal of the first embodiment of the present invention is mounted, and is a view showing a state when the front door 2 is closed.

When a front-door rear end 20 of the front door 2 comes into contact with the seal portion 13, the seal portion 13 side of the connecting portion 12 is deformed around the connecting-portion recess 16 toward the hemmed portion 33 of the rear door 3, whereby the seal-portion distal end 15 moves toward the mounting base 11. When the front door 2 is closed, the seal-portion distal end 15 is in contact with the mounting base 11.

Figure 4:
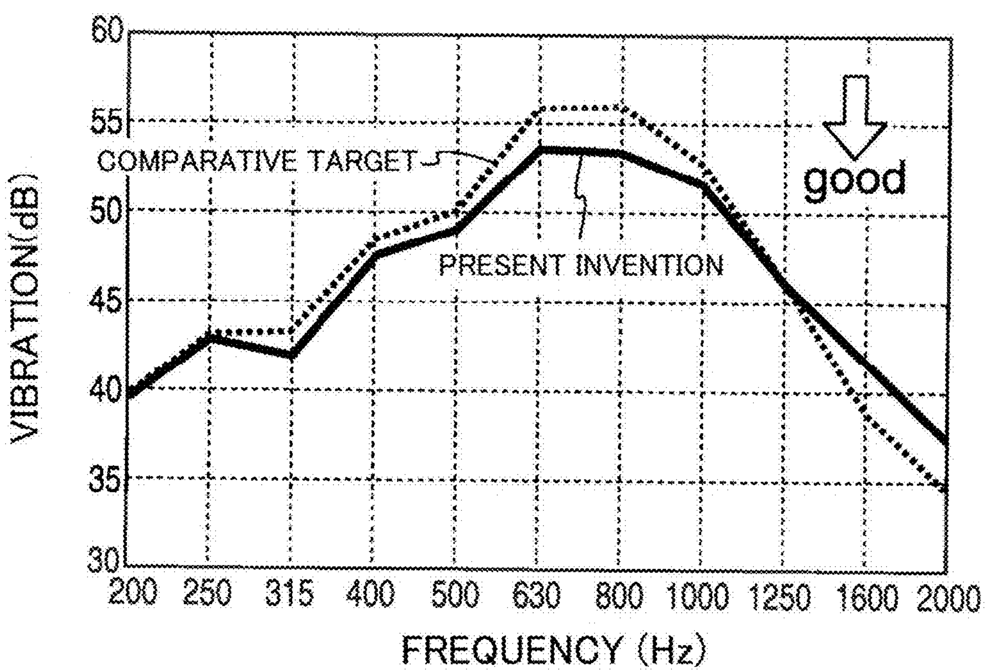
FIG. 4 is a graph of measurement results of effects of the present invention.

FIG. 4 is a graph of a measurement result of the effect of the present invention. A comparative target is a parting seal using the same sponge material as the connecting portion 12 across the entire seal portion 13 in FIG. 2.

The vibration of the front door 2 was measured during steady travel at a speed of 100 km/h. A plurality of accelerometers (vibration level meters) for receiving the vibration of the front door 2 were attached to the vehicle inner side of the front door 2. The accelerometer is a sensor part of the vibration level meter, and outputs an electric signal proportional to the vibration acceleration.

Octave analysis was used for the analysis because the frequency characteristics perceived by the human ear are homogenous. A sound pressure level for each band is measured through a bandpass filter defined in a ⅓ octave standard in a frequency range of an audible frequency relative to noise. For the characteristics and the like of the bandpass filter, refer to Japanese Industrial Standards (JIS) C 1513:2002.

In FIG. 4, a solid line represents the parting seal of FIG. 2, and a broken line represents the parting seal as the comparative target. In FIG. 4, the horizontal axis represents frequency (Hz), and the vertical axis represents vibration (dB). On the vertical axis, the higher the value, the greater the vibration. As is clear from FIG. 4, in the parting seal 10 of the present embodiment, compared to the comparative target, the vibration reduction effect is observed in the range of 200 Hz to 1000 Hz, with a significant vibration reduction effect particularly in the range of 500 Hz to 1000 Hz.

It is considered that the vibration of the front door 2 is propagated from the front-door rear end 20 to the seal portion 13 of the parting seal 10, propagated through the seal portion 13, propagated from the seal-portion distal end 15 to the mounting base 11, and then propagated from the mounting base 11 to the rear-door front end 30 as indicated by the wavy line in FIG. 3, thereby achieving the vibration reduction effect.

Figure 5:
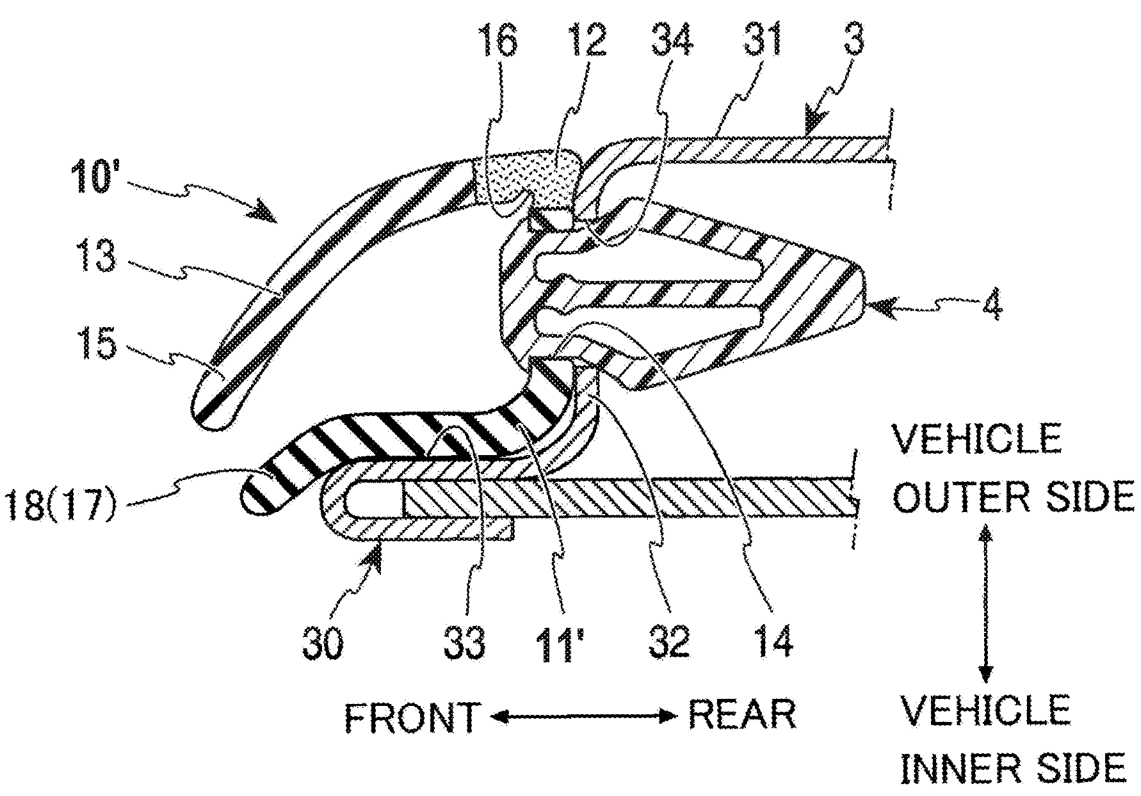
FIG. 5 is an enlarged cross-sectional view taken along line A-A of FIG. 1 in which a parting seal of a second embodiment of the present invention is mounted, and is a view showing a state before the front door is closed.
Figure 6:
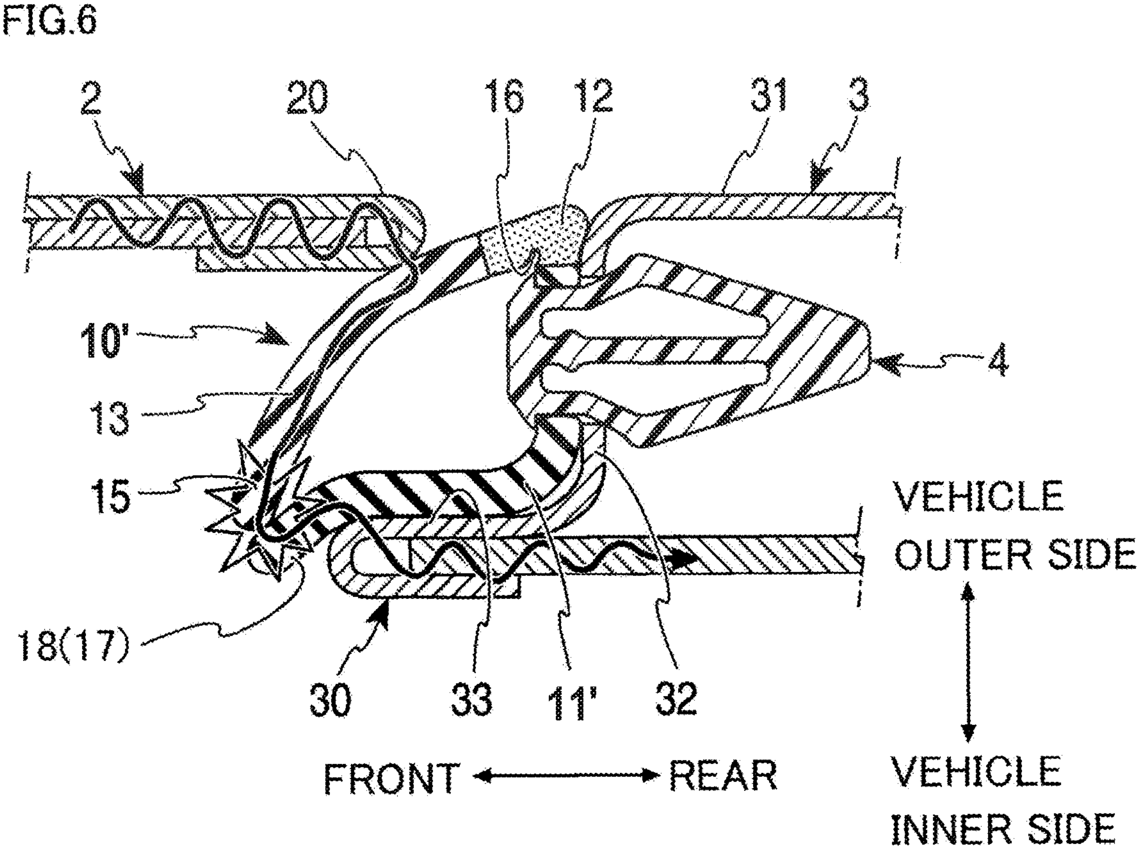
FIG. 6 is an enlarged cross-sectional view taken along line A-A of FIG. 1 in which the parting seal of the second embodiment of the present invention is mounted, and is a view showing a state when the front door is closed.

Next, a second embodiment of the present invention will be described with reference to FIGS. 5 and 6. FIG. 5 is an enlarged cross-sectional view taken along line A-A of FIG. 1 in which the parting seal 10' of the second embodiment of the present invention is mounted, and is a view showing a state before the front door is closed. FIG. 6 is an enlarged cross-sectional view taken along line A-A of FIG. 1 in which the parting seal 10' of the second embodiment of the present invention is mounted, and is a view showing a state when the front door is closed. The difference between the second embodiment and the first embodiment described above is that in the second embodiment, an inclined portion 18 extending in a direction away from the seal-portion distal end 15 is formed on a mounting-base distal end 17 of the mounting base 11' located on the side opposite to the connecting portion 12, and the seal-portion distal end 15 comes into contact with the inclined portion 18 when the front door 2 is closed.

In the second embodiment, when the front-door rear end 20 of the front door 2 comes into contact with the seal portion 13, the seal portion 13 side of the connecting portion 12 is deformed around the connecting-portion recess 16 toward the hemmed portion 33 of the rear door 3, whereby the seal-portion distal end 15 moves toward the mounting base 11', and the seal-portion distal end 15 comes into contact with the inclined portion 18 and then moves so as to slide on the inclined portion 18. Then, the front door 2 is closed in a state where the seal-portion distal end 15 is in contact with the inclined portion 18.

In the same manner as in the first embodiment described above, the vibration of the door during steady travel at a speed of 100 km/h was measured. In the second embodiment as well, it was confirmed that the same vibration reduction effect as in the first embodiment described above was obtained.

Figure 7:
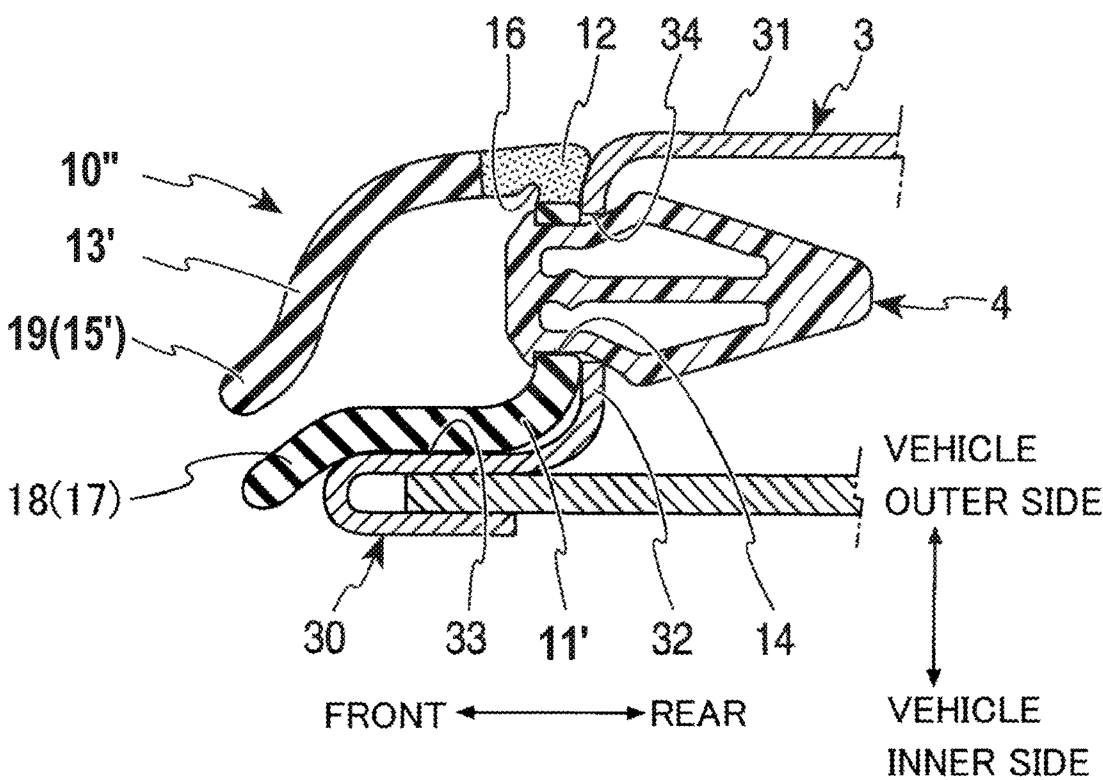
FIG. 7 is an enlarged cross-sectional view taken along line A-A of FIG. 1 in which a parting seal of a third embodiment of the present invention is mounted, and is a view showing a state before the front door is closed.
Figure 8:
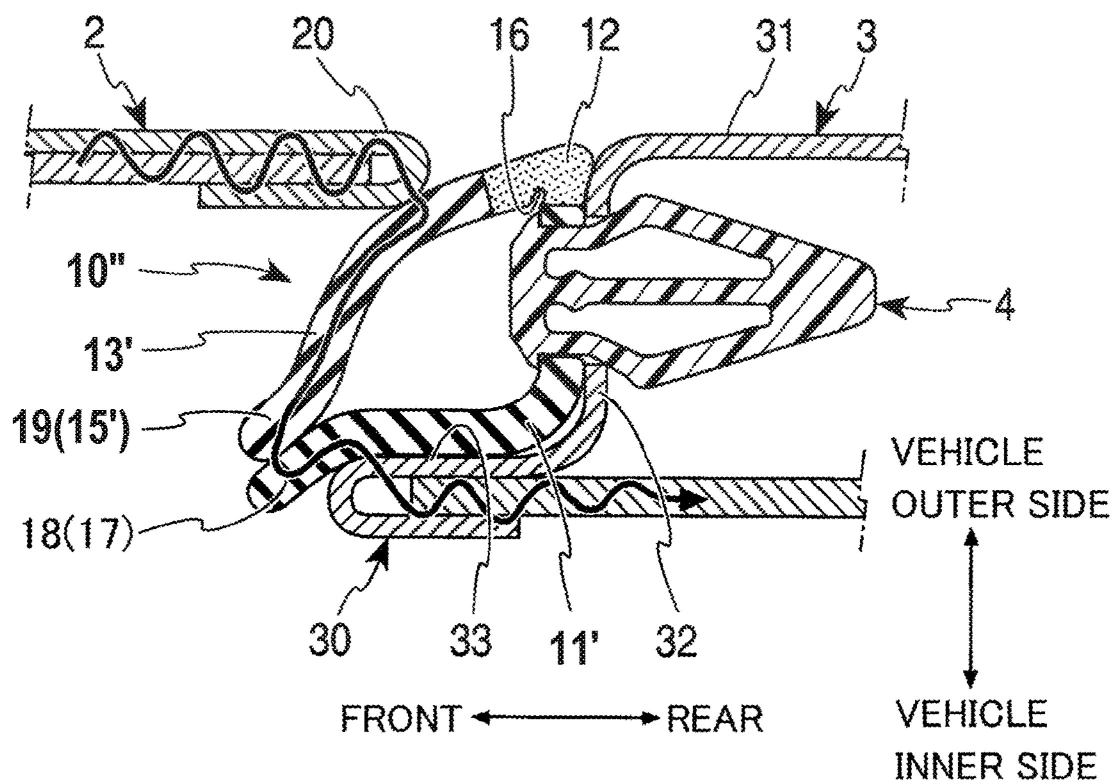
FIG. 8 is an enlarged cross-sectional view taken along line A-A of FIG. 1 in which the parting seal of the third embodiment of the present invention is mounted, and is a view showing a state when the front door is closed.
Figure 9:
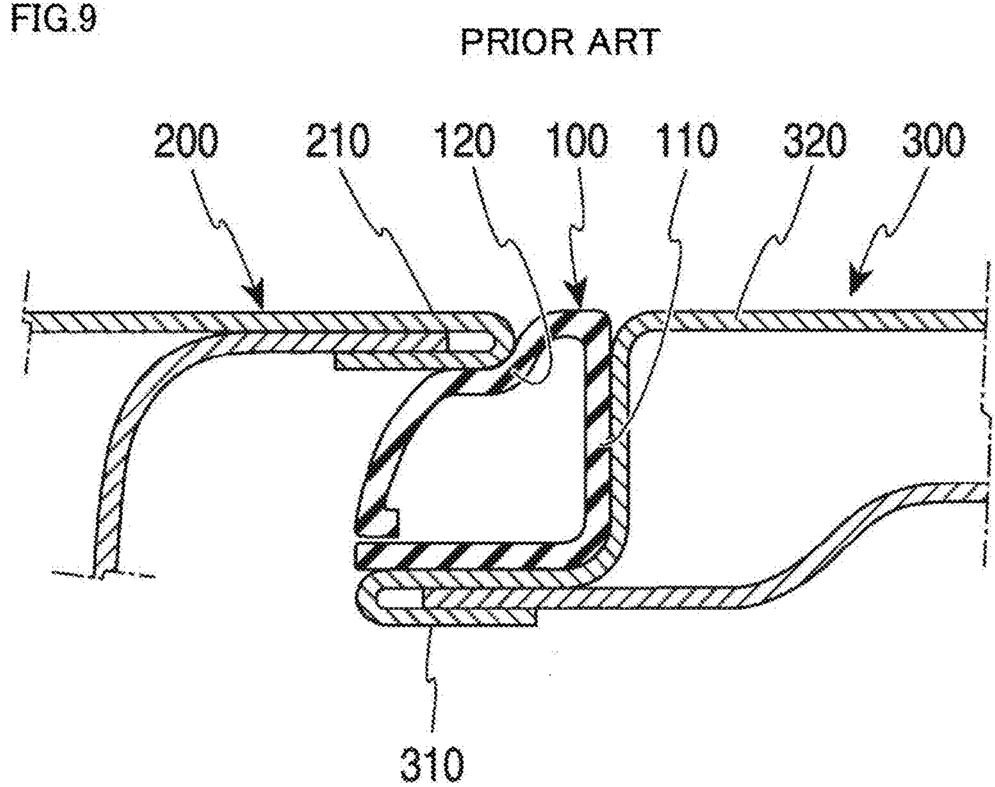
FIG. 9 is an enlarged cross-sectional view taken along line A-A of FIG. 1 in which a conventional parting seal is mounted, and is a view showing a state when a front door is closed (Japanese Patent Application Laid-Open No. 2020-117053).

Next, a third embodiment of the present invention will be described with reference to FIGS. 7 and 8. FIG. 7 is an enlarged cross-sectional view taken along line A-A of FIG. 1 in which the parting seal 10" of the third embodiment of the present invention is mounted, and is a view showing a state before the front door is closed. FIG. 8 is an enlarged cross-sectional view taken along line A-A of FIG. 1 in which the parting seal 10" of the third embodiment of the present invention is mounted, and is a view showing a state when the front door is closed. The difference between the third embodiment and the second embodiment described above is that a surface contact portion 19 is formed at a seal-portion distal end 15' of the seal portion 13' in the third embodiment.

As shown in FIG. 7, the surface contact portion 19 is formed in a direction in which the distal end side opens relative to the inclined portion 18 of the mounting base 11'.

The surface contact portion 19 is in surface contact with the inclined portion 18, as shown in FIG. 8, that is, when the front door 2 is closed.

In the same manner as in the first embodiment described above, the vibration of the door during steady travel at a speed of 100 km/h was measured. In the third embodiment as well, it was confirmed that the same vibration reduction effect as in the first embodiment described above was obtained.

As described above in detail, according to the present embodiment, the following effects can be obtained.

(1) In the first embodiment, the parting seal 10 includes the seal portion 13 and a connecting portion 12 connecting the mounting base 11 and the seal portion 13, the mounting base 11 is formed in an L shape, the seal portion 13 is formed in an arc shape protruding in a direction away from the mounting base 11, the seal portion 13 and the mounting base 11 are formed of a material with higher hardness than the connecting portion 12, and the seal-portion distal end 15 of the seal portion 13, located on the side opposite to the connecting portion 12, is in contact with the mounting base 11 when the front door 2 is closed. Therefore, when the front-door rear end 20 comes into contact with the seal portion 13, which has increased rigidity due to higher hardness, the vibration of the front door 2 caused by road noise, wind noise, or other noises can be propagated to the seal portion 13, propagated from the seal portion 13 to the mounting base 11, and further propagated from the mounting base 11 to the rear door 3. As a result, the vibration can be efficiently propagated to the rear door 3 by the air resistance during the travel of the front door 2 and the contact between the rear surface and the tire, whereby the vibration of the front door 2 can be suppressed, and the vibration reduction effect can be obtained in the range of 200 Hz to 1000 Hz. This can lead to a reduction in road noise, wind noise, and other noises.

(2) Since the connecting portion 12 is formed of the sponge material with lower hardness than the seal portion 13 and the mounting base 11, when the seal portion 13 comes into contact with the front-door rear end 20, the connecting portion 12 is deformed, enabling the seal portion 13 to follow the opening/closing movement of the front-door rear end 20. As a result, the opening/closing operation of the front door 2, particularly the closing property of the door, is not adversely affected, and damage, such as deformation or scratches, does not occur in the seal portion 13.

(3) since the connecting portion 12 is formed across the seal portion 13 and the mounting base 11, when the seal-portion distal end 15 comes into contact with the mounting base 11, the connecting portion 12 is deformed to absorb a force directed toward the connecting portion 12, enabling prevention of the seal portion 13 or the connecting portion 12 from protruding toward the vehicle outer. This can prevent the appearance from being impaired by the protrusion of the seal portion 13 or the connecting portion 12, and prevent new noise from being generated due to the protrusion of the seal portion 13 or the connecting portion 12.

(4) Furthermore, since the connecting-portion recess 16 is formed on the vehicle inner side and the seal portion 13 side of the bent part of the connecting portion 12, when the front door 2 is closed, the seal portion 13 comes into contact with the front door 2. However, the connecting portion 12 is deformed with the connecting-portion recess 16 as a base point at that time, so that the stable movement of the seal portion 13 toward the vehicle inner can be realized, and reliable and good reproducibility of the contact between the seal-portion distal end 15 and the mounting base 11 can be achieved.

(5) In the second embodiment, the inclined portion 18 extending in the direction away from the seal-portion distal end 15 is formed at the mounting-base distal end 17 of the mounting base 11' located on the side opposite to the connecting portion 12, and when the front door 2 is closed, the seal-portion distal end 15 contacts the inclined portion 18 and can then move so as to slide on the inclined portion 18. Therefore, in addition to the effects of (1) to (4) described above, the reaction force that the seal-portion distal end 15 receives from the mounting base 11' when coming into contact with the mounting base 11' can be suppressed. As a result, an adverse effect on the opening/closing operation of the front door 2 can be prevented.

(6) In the third embodiment, the surface contact portion 19 is formed at the seal-portion distal end 15', and the surface contact portion 19 comes into surface contact with the inclined portion 18 when the front door 2 is closed. Therefore, the contact area between the seal-portion distal end 15' and the inclined portion 18 is increased, and the efficiency of propagation of vibration can be improved compared to a case where the seal portion 13' and the portion 18 are in point contact.

The embodiment of the present invention is not limited to the above embodiment, and various modifications can be made without departing from the purpose of the present invention.

For example, in the above embodiment, the first member and the second member are the front door 2 and the rear door 3 which are opening/closing doors. However, the present invention can also be applied to a case of a parting seal between a fender (non-opening/closing door) and a hood (opening/closing door) and a case of a parting seal between the lower end of the front door (opening/closing door) and the lower portion of the vehicle body (non-opening/closing door).

For example, in the above embodiment, the inclined portion 18 is formed on the mounting base 11', and the surface contact portion 19 is formed on the seal portion 13'. However, a seal-portion distal end protrusion protruding toward the inclined portion 18 may be formed at the seal-portion distal end 15', and the seal-portion distal end protrusion may come into contact on the inclined portion 18. The same effect as in the third embodiment described above can be obtained by forming the seal-portion distal end protrusion.

For example, in the above embodiment, when the inclined portion 18 is formed on the mounting base 11', a space is generated between the inclined portion 18 and the front distal end of the hemmed portion 33. However, an inclined-portion protrusion, which protrudes from the inclined portion 18 toward the hemmed portion 33 and can come into contact with the hemmed portion 33, may be formed. By forming the inclined-portion protrusion, the vibration can be propagated from the inclined portion 18 to the hemmed portion 33, thereby improving the efficiency of the vibration propagation.

What is claimed is:

1. A parting seal comprising rubber or resin that seals a gap formed by an outer surface of a vehicle by a first member and a second member being adjacent to each other, at least one of the first member or the second member being an opening/closing door, wherein one end of a substantially arc shaped seal portion of the parting seal and one end of a substantially L shaped mounting base of the parting seal are connected by a connecting portion, the seal portion and the mounting base are formed of a material with higher hardness compared to a hardness of a material of the connecting portion, a seal-portion distal end of the seal portion, located opposite to the connecting portion, comes into contact with the mounting base when the opening/closing door is closed, and the connecting portion is substantially L-shaped between the mounting base and the seal portion.

2. The parting seal according to claim 1, wherein the connecting portion is disposed between the seal portion and the mounting base.

3. The parting seal according to claim 1, wherein an inclined portion, extending in a direction away from the seal-portion distal end, is formed at a mounting-base distal end of the mounting base, and the seal-portion distal end comes into contact with the inclined portion when the opening/closing door is closed.

4. The parting seal according to claim 3, wherein a surface contact portion is formed at the seal-portion distal end, and the surface contact portion comes into contact with the inclined portion when the opening/closing door is closed.

* * * * *